April 10, 1962 A. J. SHAPIRO ET AL 3,029,016
GYROSCOPE GIMBAL ERROR COMPUTER FOR AIRCRAFT AND OTHER VEHICLES
Filed April 7, 1959 3 Sheets-Sheet 1

INVENTOR.
Albert J. Shapiro
Morris M. Kuritsky
BY
ATTORNEYS

April 10, 1962  A. J. SHAPIRO ET AL  3,029,016
GYROSCOPE GIMBAL ERROR COMPUTER FOR AIRCRAFT AND OTHER VEHICLES
Filed April 7, 1959  3 Sheets-Sheet 3

INVENTORS
Albert J. Shapiro
Morris M. Kuritsky
BY
ATTORNEYS

3,029,016
GYROSCOPE GIMBAL ERROR COMPUTER FOR AIRCRAFT AND OTHER VEHICLES

Albert J. Shapiro, Spring Valley, N.Y., and Morris M. Kuritsky, Cresskill, N.J., assignors to General Precision Inc., a corporation of Delaware
Filed Apr. 7, 1959, Ser. No. 804,735
10 Claims. (Cl. 235—61)

This invention relates to gyro-equipped precision azimuth reference systems used in navigation systems for aircraft, guided missiles, and other types of vehicles operating in various media, and is particularly directed to a correction device adapted for use in conjunction with a directional gyro mounted in an airplane or other type of vehicle, in which the nominal horizontal or spin axis of the gyro is so located as to coincide with the nominal longitudinal axis of the fuselage of the aircraft, or of the structure of any other vehicle in which it is mounted.

In mounting a directional gyroscope in an airplane or other type of vehicle, the frame of the gyro is so supported that it is aligned with the nominal longitudinal axis of the airplane or other type of vehicle, the vertical axis of the frame, which is also the axis of rotation of the outer gimbal of the gyro being in alignment with the normal vertical axis of the fuselage of the airplane, or the structure of any other type of vehicle, in level flight or in substantially level motion of another type of vehicle.

During straight and level flight or level motion of another type of vehicle, the inner and outer gimbals of a directional gyroscope are substantially perpendicular to one another, the pivot axis of the inner gimbal, which supports the gyro rotor being substantially perpendicular to the pivot axis of the outer gimbal which is mounted in the frame of the gyro.

The heading angle, as determined from the gyroscope, is the angle between the outer gimbal and the frame of the instrument, and as the frame is aligned with the longitudinal axis of the fuselage, the heading angle is the angle between the outer gimbal and the longitudinal axis of the airplane, or other type of vehicle, or the navigational base line of the vehicle.

If it were possible to change the horizontal direction of the airplane or other type of vehicle, such as a guided missile or submarine, while maintaining the perpendicular relationship between the inner and outer gimbals of the gyro, the heading angle as indicated by the gyro outer gimbal, would coincide with the actual heading angle of the airplane or other type of vehicle, relative to a nominal navigational base line.

However, when an airplane, a guided missile, or other type of vehicle is turned in flight or other form of motion, it is also necessary to bank the vehicle, thus causing the vertical axis of the outer gimbal to be angularly displaced relative to the nominal vertical axis of the gyro by the angular displacement represented by the banking angle of the vehicle, while the gyro rotor or spin axis of the gyro remains relatively fixed in space.

Unless the banking motion of the airplane or other type of vehicle happens to center on the spin axis of the gyro rotor, one or both of the gyro gimbals will rotate about their respective axes to accommodate the angular motion of the frame of the gyro. The perpendicular relation between the inner and outer gimbals is thus altered.

Rotation of the outer gimbal, while the vertical axis thereof is angularly displaced, alters the relation between the outer gimbal and the frame of the instrument, so that the heading angle, as determined from the heading angle position of the outer gimbal relative to the frame of the gyro, is erroneous.

When an airplane or other type of vehicle is restored to level flight or level motion of another type of vehicle, the initial perpendicular relation between the inner and outer gimbals is restored, and the heading angle reading, as indicated on the azimuth transmitter, is correct, the error angle being eliminated.

The above angle error is present in any gyro gimbal system in which the azimuth output is controlled by the outer gimbal and the gyro spin axis serves as the actual reference direction. This error is hereinafter referred to as the gimbal error.

When an airplane or other type of vehicle is maneuvered into a bank or roll, that is, when the vertical axis of the airplane or other type of vehicle is angularly displaced and the airplane or other type of vehicle changes its heading while so banked, the change in heading as indicated in a two-gimbal directional gyro differs from the actual angular heading change due to the angular relation between the vertical axis of the airplane or other type of vehicle, and the nominal vertical axis of the gyro during such a bank or roll. The deviation is due to the "Hooke's joint error," which is essentially the error introduced by a universal joint in which the driven shaft is angularly offset relative to the driving shaft, the movement of the vertical axis of the airplane or other type of vehicle in a roll or bank, relative to the vertical axis of the gyro following a similar pattern.

The error in heading angle reading is a function of the relation between the pitch or roll angle of the airplane or other type of vehicle, which is the relation between the displaced vertical axis of the airplane or other type of vehicle and the nominal vertical axis thereof, or the nominal vertical axis of the gyro.

The primary object of the invention is to establish and compute continuously, the corrected azimuth or heading angle, which is essentially the angle which would appear in comparable level flight, or level motion, by determining the gimbal error angle, eliminating it from the heading or azimuth angle, as indicated in the azimuth reference system, and transmitting to the navigation reference system the corrected heading angular relation, to replace the uncorrected heading angle which would normally be transmitted thereto by the gyro outer gimbal.

Thus the navigation system of the vehicle and the azimuth reference system thereof are able to function at all times in a manner similar to that under which they would operate if the airplane, or other type of vehicle were continuously in level flight or level motion of another type of vehicle, all turns being made with the vertical axis of the airplane, or other type of vehicle in its nominal vertical position.

The error and the consequent correction therefor are established and computed by introducing into the apparatus a universal joint comparable to a Hooke's joint, angularly positioning the angularly movable shaft or yoke of the universal joint into an angular position relative to the axis of the fixed axis drive shaft or yoke of the universal joint, which is comparable to the pitch, or roll angle of the airplane, or other type of vehicle, by means of a servo system, which is controlled by an electrical signal received from the navigation system of the airplane or other type of vehicle, and amplifying the electrical signal so received, so that it will correspondingly displace, by means of a servo combination, the angular position of the angularly movable yoke relative to the fixed axis yoke of the universal joint, introducing into the computer an electrical signal which gives the uncorrected heading angle as received from the outer gimbal of the gyroscope, correcting said heading angle by means of a servo system and the universal joint equipped computer, and transmitting as an electrical signal to the azimuth reference system, the corrected heading angle, so that the navigation system can operate on a basis simulating that of level flight of the airplane or level motion of another type of vehicle, at all times.

Thus the navigation system and the azimuth reference system thereof function in essentially the same manner as they would in the airplane or other type of vehicle under normal conditions, except that a true, or corrected heading angle is provided in its computations, to replace the distorted or uncorrected heading angle as received from the gyro outer gimbal, while it is displaced from its nominal position, due to the angular displacement of the vertical axis of the airplane or other type of vehicle.

In aircraft, guided missiles, or other types of vehicles operated at the extremely high speeds of modern aircraft and guided missiles, any errors in heading which are introduced into the navigation system of the vehicle, are of vital importance as they tend to throw the airplane, or other type of vehicle, off its projected course during banks or rolls, therefore increasing the time required to reach the destination, the distance traversed, and consequently the amount of fuel required to complete a flight or trip of another type of vehicle.

With modern high speed aircraft and guided missiles powered by large extremely powerful gas turbines or rocket motors and the like, the fuel consumption is one of the most important factors determining the range of the airplane, guided missile, or other type of vehicle, as the fuel carried represents a major portion of the space and load allowance available for the load in military aircraft, guided missiles and the like.

Thus even relatively minor variations in course in relatively short flights or trips, in point of time, may result in a sharp enough increase in fuel consumption to prevent the airplane, guided missile, or other type of vehicle from reaching its destination, and therefore result in a forced landing.

The primary feature of the computer attachment is that its operation is continuous, the individual computations consuming a relatively insignificant amount of time, so that the corrected heading angle is reintroduced into the navigation system of the vehicle a fraction of a second after the uncorrected heading angle is received therefrom or from the gyro outer gimbal, thus maintaining the airplane, guided missile, or other type of vehicle, on its required course at all times, regardless of the angular attitude of the vertical axis of the airplane or other type of vehicle, which may be varied at any time due to wind conditions, and other factors encountered in flight, or other means of locomotion.

The corrected heading angle is of particular importance in airplane navigation or the navigation of guided missiles and the like, as the error in heading angle is introduced into the navigation system during the very time during which the pilot, operator, or automatic control device, is altering the direction of the vehicle by making a turn, in order to maintain the required course of the airplane or other type of vehicle, the airplane or other type of vehicle being of necessity banked to some degree during such a turn due to the high speeds under which the modern airplane, guided missile, and similar type of vehicle is operated.

The computer thus reduces to a minimum the amount of trial and error maneuvering necessary to correct the course during a flight or trip, thus reducing the total distance traversed, the time required for the flight or trip, and the nervous strain on the pilot, or the excessive load on the control system.

A primary feature of the computer attachment is that it is housed in a relatively small case, is compact, and of light weight, and can be mounted in any available position in the airplane, or other type of vehicle, remotely if necessary from the gyro or other parts of the navigation system.

Another feature of the apparatus is that the play and backlash in the gears used in the drives of the unit and in the universal joint incorporated therein is reduced to a minimum, thus eliminating as far as possible, or reducing to a minimum, any errors in computation in the computer as such, which may be caused by mechanical play.

Another feature of the unit is that it can readily be mounted in an airplane or other type of vehicle, equipped with a navigation system fitted with a directional gyro, without disturbing, in any manner, the mounting or operation of the navigation system, except for making the additional electrical connections required.

A feature of the computer attachment is that the entire unit is completely self-contained, and can be connected into the navigation system of the vehicle by a single readily removable connector plug.

The accompanying drawings, illustrative of one embodiment of the invention, together with the description of its construction and the method of operation and utilization thereof, will serve to clarify further objects and advantages of the invention.

It will be understood that the following description of the construction and the method of operation and co-ordination of the gyroscope gimbal error computer for aircraft and other vehicles, is intended as explanatory of the invention and not restrictive thereof.

In the drawings, the same reference numerals designate the same parts throughout the various views.

The gimbal error computer forming the subject of this invention is mounted in an airplane, a guided missile, a submarine, or any other type of vehicle in which gyros are used, for connecting errors inherent in a directional gyroscope, which is utilized as a means for indicating the azimuth or heading angle of an airplane, or other type of vehicle, the operation of the directional gyroscope being hereinafter described in greater detail.

In the following specifications, the term airplane and other vehicles includes the conventional type of airplane, including both fixed wing and rotary wing types, guided missiles of various types, surface ships, submarines, and other types of vehicle in which gyro-equipped navigation instruments are used.

Figures 9, 10, 10A:
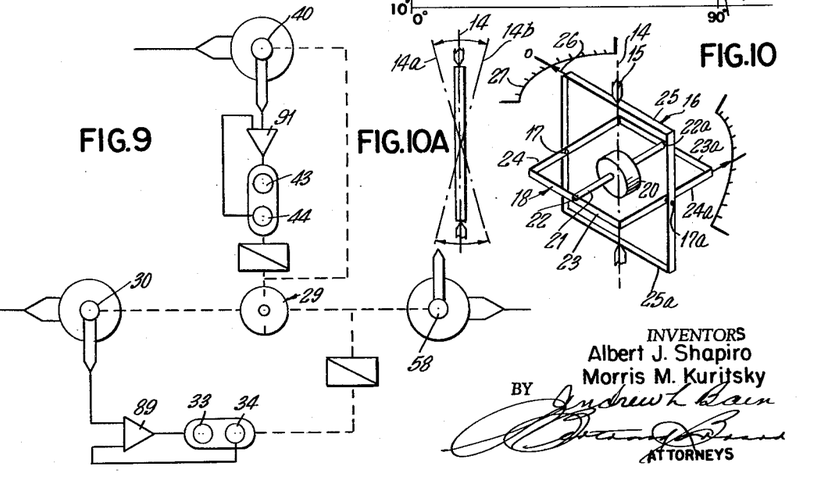
FIGURE 9 is a schematic wiring diagram and block diagram of the apparatus shown in FIGURES 1 and 2, showing the electrical circuit and the mechanical connections between the various servo and synchro components shown in FIGURES 1 and 2.
FIGURE 10 is a schematic diagram in perspective of a directional gyro, in conjunction with which the computer apparatus, shown in FIGURES 1 and 2 is used, showing the fixed frame, the outer gimbal, the inner gimbal and the gyro rotor and the spin shaft thereof.
FIGURE 10a is a schematic side elevational diagramatic view of the fixed frame of the gyro shown in FIGURE 10, showing the nominally vertical axis of the gyro displaced through various angles, in dot-dash lines, to show the pitch or roll angle of the airplane during a banking maneuver.

A directional gyroscope such as that shown schematically in FIGURE 10, is mounted in an airplane, a guided missile, a submarine, or other type of air, land or water vehicle, as a means of indicating to the pilot, or for transmittal to an electronic navigation system mounted in the airplane or other type of vehicle, or to an electrically controlled automatic pilot, the azimuth angle or heading angle of the airplane or other type of vehicle, which is the angle formed between the longitudinal axis of the airplane or other type of vehicle in which the gimbal error computer is mounted, and a navigational base line which is usually a north and south line on the compass scale, or a globe representing the earth's surface.

The directional gyro is usually mounted in an airplane or other type of vehicle in such a position and attitude that the vertical axis 14 of the frame 15 and the outer gimbal 16, which is pivotally supported by the frame 15 of the gyro is in alignment with the vertical axis of the airplane or other vehicle, which is the normal vertical axis of the airplane or other type of aircraft, or other vehicle while in level flight or level motion, with the longitudinal axis of the airplane or other vehicle substantially horizontal. The outer gimbal is usually of square, circular, or other suitable contour, the sides of which each have a pivot 17, 17a, at substantially the center thereof to pivotally support the inner gimbal 18, which in turn supports a high speed, electrically operated motor, which constitutes the rotating force of a rotor 20, which is rotatably supported relative to the inner gimbal on a shaft 21, or other support medium, the axis of which constitutes the spin axis of the gyroscope, the shaft 21 being trunnioned in a pair of pivots 22, 22a, which are located substantially at the center of a pair of arms 23, 23a, which are substantially perpendicular to the arms 24, 24a, pivotally supported by the pivots 17, 17a, attached to the vertical members of the outer gimbal 16 of the gyro.

While indicated as square in the schematic drawing shown in FIGURE 10, the outer gimbal 16 and the other gimbals supporting the rotor of the gyro may be circular, rectangular, or of other suitable contour, the primary requirement being that the relation between the spin axis of the gyro rotor and the axis of rotation of the gyro gimbals are oriented in such a manner as to allow the gyro rotor to maintain its normal spinning attitude, regardless of the angular position of the frame by which the gyro is supported, in three planes.

In normal level flight or level attitude, the vertical axis of the gyro frame or outer gimbal, and consequently the vertical axis of the airplane or other vehicle where the vehicle is in its normal level attitude, are in substantial alignment with the vertical base line used in airplane navigation or in the navigation of other types of craft. In this relation, the position of the upper and lower arms 25, 25a, of the outer gimbal 16 which is pivotally supported by the frame 15, which is in turn fixedly attached to the airplane or other vehicle, relative to the normal position thereof, indicate the angular movement of the longitudinal axis of the airplane or other type of vehicle.

Thus in the position shown in FIGURE 10, the gyro outer gimbal which for purposes of clarity has a pointer 26 projecting beyond one end of the upper arm thereof, is in alignment with the nominal north and south geographic line, thus indicating the azimuth angle as 0 on a theoretical scale 27 of circular segmental form, which is attached to the frame of the gyro and therefore the airplane or other type of vehicle in which the gyro is mounted, the scale being shown schematically in FIGURE 10, the center of the radius of the arc of the scale 27 being co-axial with the vertical axis 14 of the gyro frame.

As the airplane or other vehicle changes its course, assuming that it continues in level flight or level motion, and is not banked, the relation between the longitudinal axis of the airplane or other type of vehicle, or the upper arm 25 of the outer gimbal 16 of the gyro, assumes an angle, which is indicated on the scale 27 relative to the navigational base line, this angle being known as the azimuth angle, or heading angle of the airplane or other type of vehicle.

In place of the scale and pointer combination, shown in FIGURE 10, a servo motor or other type of synchro-device may be mounted on the vertical axis 14 of the outer gimbal of the gyro, to indicate the angular position of the outer gimbal of the gyro relative to the base line, or the heading angle of the airplane or other type of vehicle, the heading angle being transmitted to the gimbal error computer, shown in FIGURES 1 and 2, in the manner hereinafter described.

Due to the fact that in high speed flight or high speed vehicle movement, it is necessary to bank the airplane or other type of vehicle, or alter the vertical axis of the airplane or other vehicle in order to negotiate a turn, the vertical axis of the airplane or other type of vehicle and consequently the pivot axis 14 of the outer gimbal 16 of the gyro is tilted to an angular position such as those shown at 14a, 14b, in FIGURE 10a, relative to the normal vertical position thereof.

While a pointer 26 is shown attached to one arm of the outer gimbal 16 of the gyro, the actual azimuth angle of a gyro is usually transmitted by a synchro which is mounted co-axially with the pivot axis 14 of the outer gimbal 16, the synchro transmitting to an external point, such as the navigational system or an automatic pilot, the angular position of the outer gimbal 16 of the gyro, or the heading angle of the airplane, or other type of vehicle, which is indicated on the schematic scale 27 shown in FIGURE 10.

When the airplane or other type of vehicle is in level flight or in a level attitude, with the vertical axis of the gyro outer gimbal in alignment with the nominal vertical navigation line of the airplane or other type of vehicle, the heading angle indicated by the pointer 26, or the synchro mounted on the outer gimbal axis, indicates the true heading angle of the airplane or other type of vehicle.

When the airplane or other type of vehicle is banked, thus tilting the nominal vertical axis of the outer gimbal of the gyro, the heading angle indicated by the pointer 26 is distorted, an error being introduced into the indicated heading, or azimuth angle due to the pitch angle of the airplane or other type of vehicle, or the tilt angle of the gyro frame and outer gimbal for reasons hereinafter described in greater detail.

Figures 1, 3, 8:
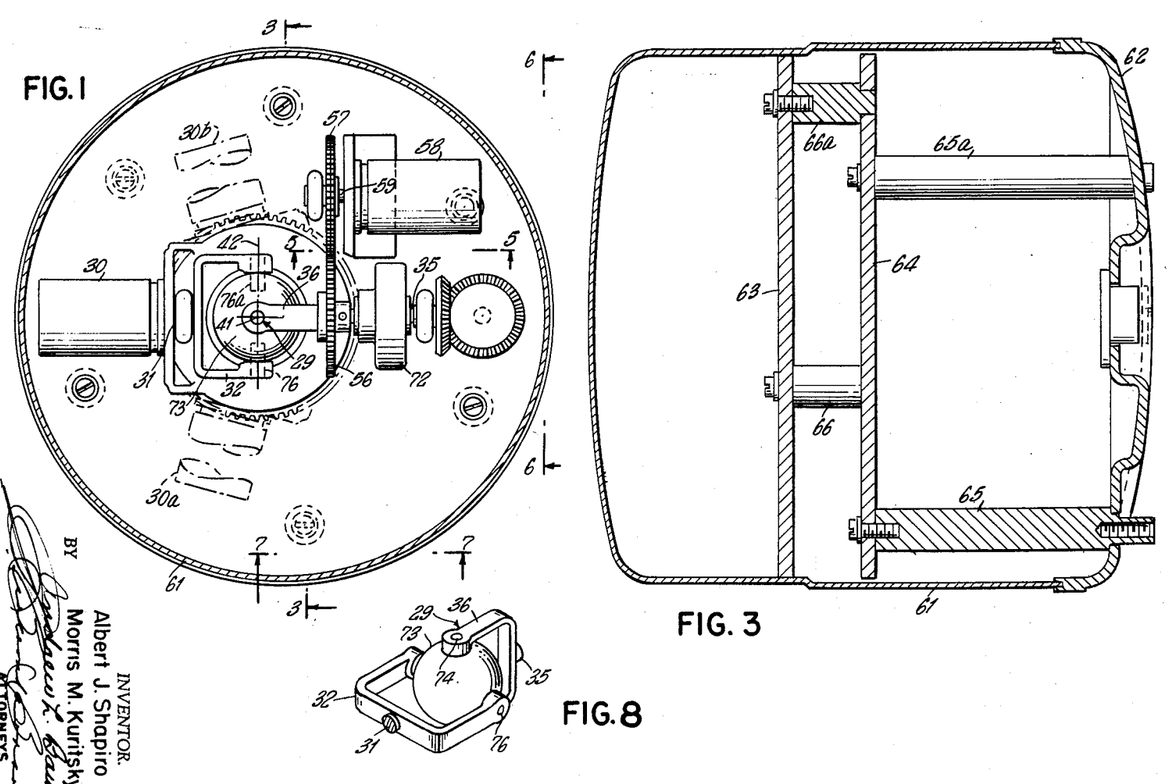
FIGURE 1 is a cross-section through the outer case, and a plan view of the gimbal error computer shown in FIGURES 2 and 3, showing the universal joint, the various servo motors and other synchro components used in conjunction therewith, and the gear train connecting the servo elements to the yokes of the universal joint and the synchro control transfer fitted thereto moved through their maximum angular range in both directions, shown in dot-dash lines.
FIGURE 3 is a longitudinal section through the case in which the gimbal error computer shown in FIGURES 1 and 2 is mounted, and the plates provided to support the servo motors, the gear train and the other parts of the servo system, taken on the line 3—3, FIGURE 1.
FIGURE 8 is a schematic perspective view of the universal joint shown in FIGURES 1 and 2, showing the fixed axis yoke and the angularly movable yoke of the universal joint, and the pivoted connecting means to which the two yokes are attached.
Figures 2, 5, 6, 7:
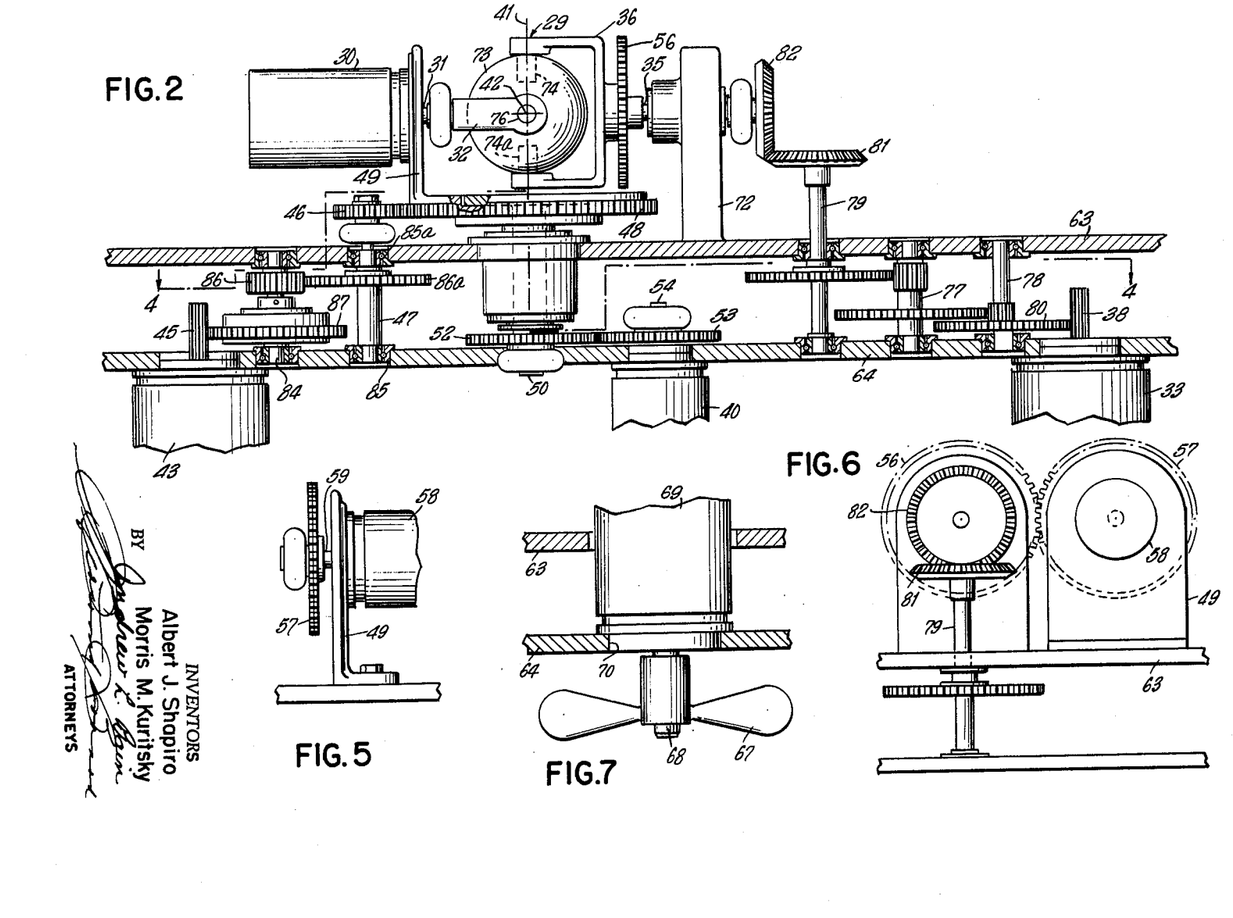
FIGURE 2 is a stretch-out section through the universal joint, servo motors, and other synchro components, and the gear trains connecting the servo components to the fixed axis yoke, and the angularly movable yoke of the universal joint respectively, to compute the corrected heading angle, also the servo components, and the gear train used in conjunction therewith to position the adjustable yoke of the universal joint at the required angular position relative to the fixed axis yoke thereof, to conform to the pitch angle of the airplane or other type of vehicle, as shown in FIGURE 1, taken on the line 2—2, FIGURE 4.
FIGURE 5 is a front elevational view of the synchro transmitter driven by the fixed axis shaft of the universal joint shown in FIGURE 1, and the anti-back lash gears fitted thereto, taken on the line 5—5, FIGURE 1.
FIGURE 6 is a side elevational view of the fixed axis shaft of the universal joint shown in FIGURE 1, and the synchro transmitter shown in FIGURES 1 and 5, also the gear train connecting the synchro transmitter to the fixed axis shaft of the universal joint, taken on the line 6—6, FIGURE 1.
FIGURE 7 is a front elevational view of the fan drive motor and the fan attached thereto, shown in FIGURE 1, taken on the line 7—7, FIGURE 1.
Figures 4, 11:
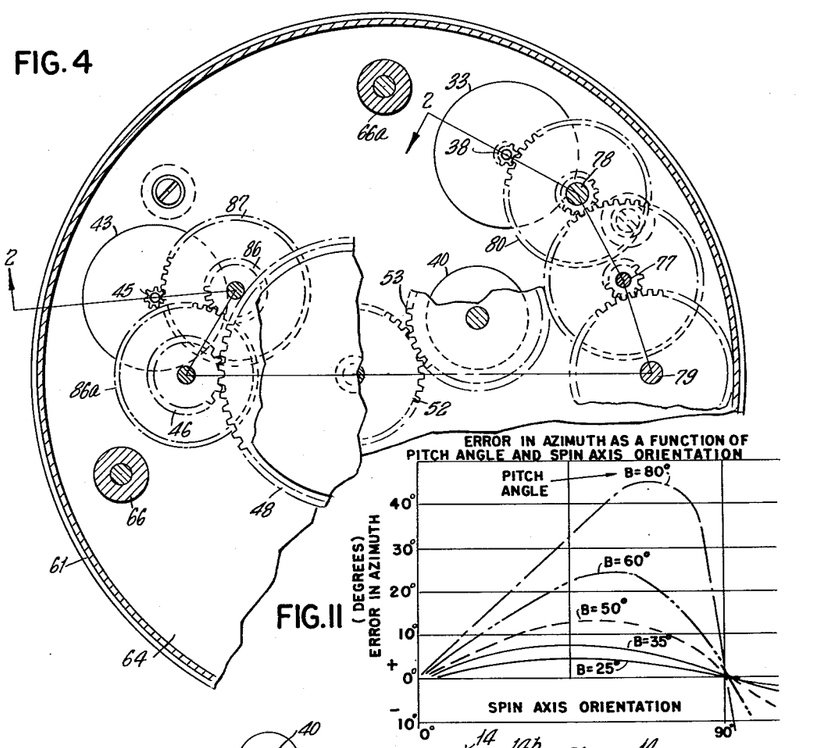
FIGURE 4 is a partial plan view and partial section through the case, the gear trains and the servo mechanism shown in FIGURES 1 and 2, taken on the line 4—4, FIGURE 2.
FIGURE 11 shows a series of curves indicating the error in azimuth or heading angle, as a function of the pitch or roll angle of the airplane, or other type of vehicle on which the mechanism is used, and the gyro spin axis orientation, each curve representing the range of the error angles at a particular pitch or roll angle of the airplane, or other type of vehicle.

The apparatus shown in FIGURES 1, 2 and 4, is provided in order to compute the error in the heading angle, as indicated by the gyro outer gimbal, introduce the error correction into the indicated heading angle, and transmit to the navigation system or the automatic pilot mounted in the airplane, or other type of vehicle, the true heading angle of the airplane or other type of vehicle, which is the angle the direction of flight of the airplane or the direction of motion of another type of vehicle would assume, if the airplane or other type of vehicle were maintained in level flight at all times.

The fundamental theory behind the operation of applicant's apparatus is as follows:

The error introduced into the heading angle of an airplane or other type of vehicle during a bank varies with the bank or pitch angle of the airplane or other type of vehicle, which is the angle formed between the vertical axis of the airplane in level flight and the actual position of the vertical axis of the airplane or other type of vehicle, or the vertical axis 14 of the gyro frame and outer gimbal during a bank.

As an example of the variations in the error introduced into the azimuth or heading angle:

Assuming an airplane or other type of vehicle, the momentary heading angle of which is 90° to the direction of the spin axis of the gyroscope, as shown in FIGURE 10. When the airplane or other type of vehicle banks for a turn, the outer gimbal 16 of the gyro shown in FIGURE 10, is displaced about its pivot axis. As the airplane or other type of vehicle changes its heading angle, both gimbals 16 and 18 are angularly displaced about their axes of rotation.

If the heading angle of the airplane or other type of vehicle is displaced through 45°, the base will turn through a 45° angle. However, to accommodate this motion, the outer gimbal 16 will rotate about its axis 14 and the reading on the azimuth transmitter of the navigation system will change by more than 45°.

The degree of error depends upon the bank angle of the vehicle. If the bank angle were for example 60°, the error would be 22°. Thus if the azimuth transmitter output originally read 90°, the uncorrected heading angle would be 90°, plus 45°, plus the error angle of 22°, or a total of 157°, instead of the correct reading of 90°, plus 45°, or 135° for the heading angle.

The error angle introduced into the azimuth or heading angle is, of course, an instantaneous error, which is due to the relative direction of the spin axis of the gyro and the aircraft, or other type of vehicle's heading angle, and the angle of the bank thereof.

The error increases as the pitch or bank angle of the airplane or other type of vehicle increases. When the pitch or bank angle becomes zero as in levelling out of a bank, the nominal vertical axis of the airplane or other type of vehicle coinciding with the actual vertical axis thereof, the error becomes zero, the actual heading or azimuth angle being the correct heading or azimuth angle.

FIGURE 11 shows various curves giving the azimuth error angles relative to the spin axis orientation at various pitch angles of the airplane, or other type of vehicle.

It should be understood that this error of 22° is an instantaneous error due to the relation between the spin axis of the gyro, the heading of the airplane or other type of vehicle, and the banking angle of the airplane or other type of vehicle.

The error also increases with increases in the bank or pitch angle of the vehicle, the rate of increase of the peak error angle, however, being considerably greater than the rate of increase of the bank angle.

When the bank or pitch angle approaches and reaches zero again, as the airplane or other type of vehicle levels out in coming out of a turn, the error disappears entirely, the heading angle, as read from the gyro outer gimbal, being the actual heading angle of the airplane or other type of vehicle.

The gimbal error hereinbefore described is identical in form to a universal or Hooke's joint error. The equation for the Hooke's joint error is in the form:

$$\tan G = \tan A, \cos P$$

in which $A$ = azimuth angle
$G$ = gyro transmitter angle
$P = \frac{1}{2}$ pitch or roll angle Hence the gimbal error angle is the difference between $A$ and $G$, or $Eg = G - A$, where $Eg$ = gimbal error.

Therefore, in order to determine, compute and correct for the error angle, a Hooke's joint, or universal joint 29 is introduced into the computer device, the universal joint in the computer being essentially reversed from that which forms the basis of the error angle in the navigation system, as shown in the attached diagram, FIGURE 11.

The heading angle which includes the error, as received from the directional gyro, is transmitted to a synchro control transformer 30, the rotor shaft 31 of which is supported by the angularly movable yoke 32 of the universal joint shown in FIGURES 1 and 2.

As shown in the block diagram, FIGURE 9, the amplified signal from the control transformer 30, which indicates the angular position of the shaft thereof, is transmitted to a servo-motor 33, which is directly coupled to a generator 34, mounted co-axially with the servo-motor, the shaft of the servo-motor 33 rotating a fixed axis shaft 35 which is co-axial with the fixed axial position yoke 36 of the universal joint 29 and fixedly attached thereto, by means of a gear train shown in FIGURE 2, and hereinafter described in greater detail. Until the angularly movable yoke 32 of the universal joint 29 is moved to a rotational angular position corresponding to the rotational angular position of the shaft 31 of the control transformer 30, a voltage signal is transmitted by the synchro control transformer, which continues to adjust the angular position of the shaft 38 of the servo-motor, which is directly coupled to the shaft of the generator 34, the servo-motor shaft 38 rotating the shaft of the control transformer 30 by means of the angularly movable yoke 32 of the universal joint to which the shaft of the control transformer is attached.

The control transformer 30, the shaft 31 of which is attached to the angularly movable yoke 32 of the universal joint, receives the uncorrected heading angle from the gyro outer gimbal as an electrical signal. This signal as amplified, energizes the servo-motor 33, which rotates the shaft 31 of the control transformer 30 to a rotational angular position conforming to the uncorrected heading angle $A + Eg$. When the amplified heading angle signal from the amplifier 89 rotates the fixed axis shaft 35 of the universal joint to a corresponding position, the fixed axis shaft of the universal joint assumes a rotational angular position corresponding to the corrected heading angle A. This drives the shaft of the control transformer 30 to the angle at which it is initially positioned, so that the control transformer is at its null position, no current flowing to the servo-motor 33, so that the rotation of the servo motor shaft 38 is arrested.

Simultaneously with the rotation of the shaft of the servo-motor 33, a pitch or roll angle signal is received by a control transformer 40, which is mounted substantially parallel to a plane through the pivot axes 41 and 42 of the universal joint yokes 32 and 36.

The pitch or roll angle signal as received by the control transformer is amplified and transmitted to a servo-motor 43, which has a generator 44 mounted co-axially therewith, the shaft 45 of the servo-motor controlling the rotation of a train of gears hereinafter described, an idler gear 46 which is mounted on an auxiliary shaft 47, parallel to the servo motor shaft, driving a ring gear 48, which is attached to a vertical shaft 50, which is co-axial with the intersection of the pivot axes of the universal joint 29.

A gear 52 mounted on the vertical shaft 50 meshes with a gear 53 mounted on the shaft 54 of the pitch angle synchro control transformer 40, thereby rotating the shaft of the synchro control transformer to a rotational angular position corresponding with the rotational angular position of the shaft of the servo-motor 43.

Until the angular position of the shaft of the synchro control transformer 40 coincides with the angular position received as a pitch or bank angle signal by the synchro control transformer 40 from the navigation system, an amplified signal voltage is transmitted from the synchro control transformer, which rotates the servo-motor shaft 45 until the rotational angular position of the synchro control transformer shaft conforms exactly to the pitch angle position as received from the navigation system. At this angular position of the synchro control transformer shaft, the synchro control transformer 40 is at its null position, and no voltage signal is transmitted by the synchro control transformer, so that the rotation of the servo motor shaft 45 is arrested.

When the servo-motor shaft 45 is rotated, the angularly movable yoke 32 of the universal joint 29 is rotated from its axially aligned position shown in FIGURE 1, about the pivot center, until it approaches one of the angularly displaced positions shown by dot-dash lines, FIGURE 1, which conforms to the pitch or bank angle position of the airplane or other type of vehicle. The synchro control transformer 30, the shaft of which is attached to the angular movable yoke is moved to the angular position similar to that shown by dot-dash lines, FIGURE 1, by the angular displacement of the universal joint yoke 32.

As the synchro control transformer 30 is angularly displaced from the axially aligned position shown in FIGURE 1 to the angularly displaced position 30a or 30b, similar to those shown by dot-dash lines, FIGURE 1, an error is introduced into the rotational angular relation between the rotational angular position of the shaft 31 of the synchro control transformer and the fixed axis angularly rotated shaft 35 of the yoke 36 of the universal joint 29.

Assuming that no change in the heading angle of the airplane or other vehicle occurs, the uncorrected heading angle $A+Eg$ as received from the gyro outer gimbal is transmitted as an amplified voltage to the servo motor 33, the shaft 38 of which is rotated to a corresponding angular position in the manner hereinbefore described.

When equilibrium is established and the rotational angular position of the shaft of the synchro control transformer 30, conforms substantially to the uncorrected heading angle as received from the gyro outer gimbal, the synchro control transformer 30 is at its null position, so that no voltage is generated by the synchro control transformer, and in that manner the rotation of the servo-motor shaft 38 is arrested.

As the angular rotation of the synchro control transformer shaft 31 is offset from the true heading angle because of the angular position of the shaft 31 relative to the fixed axis shaft 35 of the universal joint in the manner hereinbefore described, the rotational angular position of the shaft 35 of the fixed axis yoke of the universal joint represents the true heading angle of the airplane or other type of vehicle, the error angle having been eliminated.

The rotational angular position of the fixed axis shaft 35 of the yoke of the universal joint is transmitted by means of a pair of gears 56, 57, shown in FIGURES 1 and 6, the ratio of which is 1 to 1, or other required ratio, the driven gear 57 of which is mounted on the shaft of a synchro transmitter 58 which is mounted substantially parallel to the universal joint yoke fixed axis shaft 35, as shown in FIGURES 1, 5 and 6.

In this manner, the shaft 59 of the synchro transmitter 58 is rotated through an angle equal to or directly proportional to the angle of rotation of the fixed axis universal joint yoke shaft 35, and therefore represents the true heading angle of the airplane or other type of vehicle, the error angle having been eliminated.

The angular position of the shaft 59 of the synchro transmitter relative to the stator thereof, is transmitted as a signal to the navigation system, into which it is introduced in place of the uncorrected heading angle signal originally received from the gyro outer gimbal.

In this manner, the corrected heading angle is introduced into the navigation system, or the automatic pilot of the airplane or other type of vehicle, thus enabling the airplane or other type of vehicle to proceed on its true course regardless of the pitch or bank angle of the airplane or other type of vehicle.

As the true heading angle is transmitted to the navigation system, regardless of the pitch angle or bank angle of the airplane or other type of vehicle, no adjustment or variation in course is necessary when the airplane or other type of vehicle is again levelled out, so that the navigation system shows the true heading angle of the vehicle at all times.

While other components and additional gear trains are incorporated in the device in a manner hereinafter described, the above constitutes the basic construction and the primary basis for the operation of the gimbal error computer.

As the backlash in the universal joint 29 and the gears fitted thereto is reduced to an absolute minimum by accurate manufacture and the introduction of spring loaded, or other type of anti-backlash gears, such as the gear 57 shown in FIGURES 1, 5 and 6, and as the time lag between the rotational angular movement of the shaft of the synchro control transformer 30, and the corresponding synchro transmitter 58 is relatively insignificant, the corrected heading angle is restored to the navigation system only a fraction of a second after the uncorrected heading angle is received from the gyro outer gimbal.

The navigation system is therefore controlled entirely by the true, or corrected heading angle of the airplane or other type of vehicle, regardless of the heading angle of the airplane or other type of vehicle, and the attitude of the vertical axis of the airplane or other type of vehicle, relative to the nominal vertical axis thereof, in level flight or level attitude of the vehicle.

The same condition applies when the position and path of the airplane or other type of vehicle is instantaneously changed due to wind or weather conditions.

The airplane or other type of vehicle is maneuvered, either by the pilot or by the automatic pilot, or the operator of the vehicle, back to its true course, and to the required heading angle in a minimum of time, the gyro of the navigation system providing the heading angle, and the angle error computer restoring into the navigation system the corrected heading angle at all times.

As shown in FIGURE 3, the entire unit is mounted in a hollow substantially cylindrical case 61 made of sheet metal or other suitable material, a dished bottom cover 62 being attached to the open end of the outer wall of the case in the manner shown in FIGURE 3.

A pair of flat substantially parallel support plates 63, 64 is mounted in the case 61, as shown in FIGURE 3, the lower support plate, right-hand, FIGURE 3, being supported by a plurality of columns 65, 65a, as shown in FIGURES 3 and 4, the lower end of the columns being attached to the dished cover 62 in the manner shown in FIGURE 3.

The two support plates 63 and 64 are held in place and separated by a plurality of spacers 66, 66a, as shown in FIGURES 3 and 4, which are pressed into, or otherwise attached to the lower support plate 64 in the manner shown in FIGURE 3.

As shown in FIGURES 1 and 7, the entire unit is cooled by a fan 67, which is attached to the lower end of the shaft 68 of a fan motor 69, which is attached to the lower support plate 64, a cylindrical pilot 70, located at the lower end of the fan motor 69, accurately aligning the fan motor with the lower support plate 64.

The universal joint 29 of the gimbal error computer, as shown in FIGURES 2 and 9, consists of a fixed axis yoke 36 which is fixedly attached to one end of the fixed axis shaft 35, which is trunnioned in a bracket 72 attached to the upper support plate 63 of the case 61 shown in FIGURES 1, 2 and 3, the shaft being supported by a pair of ball bearings, or other suitable support means. The central pivoted end of the yoke is pivotally attached to a central ball 73, or other type of pivot member, by a pair of pivot pins 74, 74a, as shown in FIGURE 2.

The angularly movable yoke 32 of the universal joint is attached to the outer end of the shaft 31 of the synchro control transformer 30, the central end of the arms of the yoke being pivotally attached to the pivot ball 73, or other pivot member of the universal joint, by a pair of pivot pins 76, 76a, in substantially the same manner as the yoke 36, the axis of rotation of the pivot pins 76 and 76a being substantially perpendicular to the axis of rotation of the pivot pins 74 and 74a, and in substantially the same plane therewith, the two axes intersecting one another at substantially the center of the ball 73.

In order to transmit the heading angle "A" of the airplane or other type of vehicle with the error angle Eg included therein, to the angularly movable yoke 32 of the universal joint, through the fixed axis shaft 35 on which the fixed axis yoke 36 of the universal joint 29 is mounted, a plurality of intermediate shafts 77, 78 and a bevel gear support shaft 79 are incorporated between the servo motor shaft 38 and the fixed axis shaft 35 on which the yoke 36 of the universal joint is mounted, the shafts being substantially parallel to the shaft 38 of the servo-motor 33. Each of the intermediate shafts 77, 78 and the bevel gear support shaft 79 is supported by a pair of ball bearings fitted to the upper and lower support plates 63 and 64 mounted in the case 61 of the gimbal error computer, as shown in FIGURE 2.

The intermediate shaft 78 is driven by the servo-motor 33 by means of a gear 80, which meshes with the teeth on the pinion shaft 38 of the servo-motor. The bevel gear support shaft 79 on which a bevel gear 81, which drives a bevel gear 82 mounted on the fixed axis shaft 35 of the yoke of the universal joint is mounted, is driven by a plurality of pinion and gear combinations shown in FIGURES 1 and 2, the pinion and gear combinations on the shafts 78, 77 and 79 also stepping down the rotational angular movement of the bevel gear support shaft 79 and the fixed axis shaft 35 attached to the yoke of the universal joint, so that the rotational angular movement of the fixed axis shaft 35, while proportional to the angular movement of the servo-motor shaft 38 is considerably less than the angular movement of the servo-motor shaft.

In order to transmit the pitch or bank angle of the airplane or other type of vehicle to the angularly movable yoke 32 of the universal joint 29, a pair of intermediate shafts 47, 84, is mounted between the support plates 63 and 64 in the case 61, the intermediate shafts being substantially parallel to the axis of rotation of the servo-motor shaft 45. Each intermediate shaft is trunnioned in a pair of ball bearings 85, 85a, fitted to the upper and lower support plates respectively.

A large ring gear 48 is attached to the base of the bracket 49 which supports the synchro control transformers 30, the ring gear being co-axial with the pivot center of the pivot ball 73 of the universal joint 29, as shown in FIGURE 2. The ring gear 48 is driven by an idler gear 46 mounted on the intermediate shaft 47, which is in turn driven by a pair of idler gears 86, 86a mounted on the intermediate shafts 84 and 47 respectively.

The intermediate shaft 84 is driven from the servo-motor shaft 45 by means of a gear 87, which meshes with the teeth on the pinion shaft 45 of the servo-motor 43.

As shown in the wiring circuit and the schematic block diagram, shown in FIGURE 9, the signal current from the synchro control transformer 30, which receives the uncorrected heading angle signal from the outer gimbal of the gyro, is fed to an amplifier 89, which in this instance may be a transistorized amplifier, the amplified signal current from the amplifier being fed to the servo-motor 33, which is directly coupled to a generator 34. The voltage from the generator 34 is fed back to the amplifier 89. While the voltage generated by the generator is proportional to some extent to the angular position of the generator shaft relative to the starting position thereof, the voltage generated by the generator is primarily controlled by the speed of rotation or angular movement of the generator shaft. The generator voltage fed to the amplifier 89 therefore tends to dampen out minor variations in angular position of the servo-motor shaft, and stabilize the operation of the servo loop hereinbefore described.

The servo-motor 33 rotates the shaft 35 on which the fixed axis yoke 36 of the universal joint 29 is mounted, by means of the gear train, thereby rotating the fixed axis shaft 35 of the yoke of the universal joint to the corrected heading angle, when the angular position of the shaft of the servo-motor 33 corresponds to the angular position of the shaft of the synchro control transformer 30. At the angular position of the servo-motor 33, at which the rotational angular position of the synchro control transformer 30 conforms exactly to the signal as received from the gyro outer gimbal, the synchro control transformer is at its null position, and therefore no voltage is fed to the amplifier 89, so that no voltage is fed to the servo-motor 33, the shaft position of which remains unchanged until either the heading angle or the pitch or bank angle as fed to angularly movable yoke of the universal joint 29 is changed. The corrected heading angle from the shaft 35 supporting the fixed axis yoke 36 of the universal joint is mechanically transmitted to the synchro transmitter 58 in the manner shown in FIGURES 1, 2 and 6, and hereinbefore described, this corrected heading angle from the synchro transmitter 58 being fed to the navigation system of the airplane or other type of vehicle in the manner hereinbefore described.

The pitch or bank angle signal is received by a synchro control transformer 40 from the navigation system of the airplane, or other type of vehicle, the signal being fed to an amplifier 91, which is similar to the heading angle amplifier, the amplified signal voltage being fed to a servo motor 43 which is directly coupled to a generator 44. The voltage from the generator is fed back to the amplifier 91. The amplified signal voltage from the amplifier is utilized to drive the shaft of the servo motor 43 in the same manner as in the heading angle system. The voltage generated by the generator 44 which is fed back to the amplifier 91 functions in substantially the same manner as the voltage of the heading angle generator 34, the amplified generator voltage tending to dampen out minor variations in rotational angular position of the servo motor shaft, and stabilize the operation of the pitch or bank angle servo loop hereinbefore described. The servo-motor 43 rotates the ring gear 48, which is attached to the bracket supporting the heading angle control transformer 30, by means of the gear train shown in FIGURE 2 and hereinbefore described, thereby angularly moving the movable yoke 32 of the universal joint and the synchro control transformer attached thereto to an angular position corresponding to the pitch or bank angle of the airplane or other type of vehicle, as shown by dot-dash lines, FIGURE 1. When the angular position of the axially movable yoke of the universal joint corresponds to the angular position of the shaft of the synchro control transformer 40, the synchro control transformer is at its null position, so that the signal voltage as fed to the amplifier by the synchro control transformer 40 is substantially zero, thus arresting the rotation of the shaft of the servo motor and retaining the axially movable yoke of the universal joint in the required angular position, until a revised pitch or bank angle signal is received by the synchro control transformer 40. This enables the universal joint 29 to determine and eliminate from the uncorrected heading angle the error angle hereinbefore described, and transmit to the synchro transmitter 58 the corrected heading angle.

The servo mechanism shown in FIGURES 1, 2 and 4, the method of mounting the various components thereof, and the gear trains connecting the various elements of the servo mechanism to the yokes and shaft of the universal joint may be altered considerably from those shown in FIGURES 1, 2 and 4, and hereinbefore described, the essential feature being the use of a universal joint, such as that shown in FIGURES 1, 2 and 4, or another type of universal joint which functions in substantially the same manner, as a means of computing the error in the heading angle of an airplane, or other type of vehicle, as determined when the airplane or other type of vehicle is banked, correcting the heading angle by eliminating therefrom the error so computed, and transmitting to the navigation system of the airplane or other type of vehicle, or to an automatic pilot, or as an indication on a dial or counter, which may be used by the pilot or other vehicle operator, the corrected heading angle as determined by the gimbal error computer.

It will be apparent to those skilled in the art, that the present invention is not limited to the specific details described above and shown in the drawings, and that various modifications are possible in carrying out the features of the invention and the operation, actuation and the method of connecting and utilization thereof, without departing from the spirit and scope of the appended claims.

What is claimed is:

1. A device for determining the error in the heading angle in the navigation system of a vehicle fitted with a directional gyro, to ascertain and correct for the error caused in the heading angle as indicated by the gyro by tilting the pivot axis of the gyro outer gimbal, comprising a computing device into which the uncorrected heading angle of the vehicle is introduced under control of an electrical signal, and the angular displacement of the nominally vertical pivot axis of the outer gimbal of the gyro is introduced under control of a second electrical signal, means incorporated in said device adapted to receive the electrical signals from an external source, amplify the electrical signals so received, convert said electrical signals to rotational angular shaft positions, determine from said rotational angular shaft positions the heading angle error and the corrected heading angle for each heading angle and the pivot axis tilt angle of the gyro outer gimbal combination, and convert said corrected heading angle to a third electrical signal and transmit the third electrical signal to a remotely located point in the vehicle as an electrical signal.

2. A device for correcting the heading angle in the navigation system of a vehicle fitted with a directional gyro having an outer gimbal supported on a pivot axis co-axial with the nominal vertical axis of the vehicle, to determine and correct for the error caused in the heading angle as indicated by the outer gimbal of the gyro by tilting the pivot axis of said outer gimbal, comprising a correcting device into which the uncorrected heading angle is introduced from the outer gimbal of the gyro under control of a first electrical signal, a portion of said device being adapted to be angularly displaced to introduce the tilt angle of the pivot axis of the outer gimbal, the tilt angle of the pivot axis of the outer gimbal of the gyro being introduced under control of a second electrical signal, means mounted in said device for individually amplifying the first and second electrical signal adapted to physically angularly displace a portion of said device through an angle proportional to the tilt angle of the pivot axis of the gyro outer gimbal, means controlled by the amplified first electrical signal for determining the error angle and correcting the uncorrected heading angle as received, and means for receiving the corrected heading angle from the correcting device and converting the corrected heading angle to a third electrical signal and transmitting the third electrical signal to an external point.

3. A device for determining the error in the heading angle in the navigation system of a vehicle fitted with a directional gyro, having an outer gimbal supported on a pivot axis co-axial with the normal vertical axis of the vehicle, to ascertain and correct for the error caused in the heading angle of the vhicle, as indicated by the outer gimbal of the gyro, the error being precipitated by tilting the pivot axis of the outer gimbal of the gyro, comprising a correcting device into which the uncorrected heading angle is introduced from the gyro outer gimbal under control of a first electrical signal, the tilt angle of the pivot axis of the outer gimbal of the gyro being introduced under control of a second electrical signal, means mounted in said device for individually amplifying the first and second electrical signals so received, means controlled by the amplified second electrical signal adapted to reproduce proportionately the tilt angle of the pivot axis of the outer gimbal of the gyro, means controlled by the amplified first electrical signal and the tilt angle reproducing means for determining the error angle and correcting the uncorrected heading angle as received, and means for receiving from the correction device the corrected heading angle and converting the corrected heading angle to an electrical signal and transmitting said third electrical signal to an external apparatus.

4. A combination heading angle correction device, as in claim 3, in which the means for reproducing the tilt angle of the pivot axis of the gyro outer gimbal includes a universal joint consisting of a fixed axis member, and an angularly movable member pivotally attached to the fixed axis member, the angularly movable member being adapted to be moved to an angular position relative to the fixed axis member in one plane, co-ordinated with the tilt angle of the pivot axis of the gyro outer gimbal, and servo means controlled by the amplified second electrical signal adapted to angularly displace the angularly movable member of the universal joint relative to the fixed axis member thereof, through an angle proportional to the tilt angle of the pivot axis of the gyro outer gimbal, supported by the angularly movable member of the universal joint adapted to receive the first electrical signal, means operatively connected to the fixed axis member of the universal joint adapted to determine the corrected heading angle from the amplified first electrical signal, and the relation between the angular position assumed by the angularly movable member of the universal joint relative to the fixed axis member thereof, and means for operatively connecting the fixed axis member of the universal joint to the corrected heading angle transmission means.

5. A combination heading angle correction device as in claim 3, in which the means for reproducing the tilt angle of the gyro outer gimbal pivot axis includes a universal joint consisting of a fixed axis yoke, and a yoke angularly movable in one plane relative to the fixed axis yoke, pivotally attached to the fixed axis yoke, servo means controlled by the second electrical signal adapted to angularly displace the angularly movable yoke of the universal joint relative to the fixed axis yoke thereof, through an angle proportional to the tilt angle of the pivot axis of the gyro outer gimbal, a bracket rotatably supported on a shaft co-axial with the junction of the pivot axes of the fixed axis and angularly movable yokes of the universal joint, the fixed axis yoke of the universal joint having a shaft co-axial therewith fixedly attached thereto, a synchro device having a rotatable shaft projecting therefrom, fixedly supported by the rotatably supported bracket, the shaft of said synchro device being co-axial with the longitudinal axis of the angularly movable yoke of the universal joint in the aligned position, said synchro device being adapted to receive the first electrical signal, means operative to amplify the heading angle electrical signal received from the synchro device, a servo motor controlled by the amplified electrical signal received from the synchro device adapted to rotate the fixed axis yoke of the universal joint through an angle related to the angle through which the angularly movable yoke of the universal joint is rotated, a generator directly coupled to the servo motor adapted to transmit an electrical signal to the amplifier means, the amplified signal voltage from the amplifier means being adapted to control the rotation of the shaft of the servo motor co-ordinated with the rotational angular position of the shaft of the synchro device, which is attached to the angularly movable yoke of the universal joint, the rotational angular position of the shaft attached to the fixed axis yoke indicating the corrected heading angle of the correction device after the error angle is eliminated, and means operatively connecting the shaft attached to the fixed axis yoke of the universal joint to the corrected heading angle transmission means.

6. A combination heading angle correction device as in claim 3, in which the means for reproducing the tilt angle of the pivot axis of the gyro outer gimbal includes a universal joint consisting of a fixed axis member and a second member angularly movable in one plane relative to the fixed axis member, pivotally attached to the fixed axis member, a bracket rotatable about an axis in co-axial alignment with the pivot axes of the members of the universal joint, a ring gear attached to said bracket concentric with the axis of rotation thereof, a servo motor mounted substantially parallel to the axis of rotation of the bracket adapted to rotate the bracket by means of a gear train incorporated between the servo motor and the bracket ring gear, a synchro device mounted substantially parallel to the axis of rotation of the bracket and fixedly attached to said bracket, said synchro device being adapted to receive the second electrical signal, means operative to amplify the second electrical signal received from the synchro device, a generator directly coupled to the servo motor adapted to transmit an electrical signal to the amplifier means, the amplified signal established by the signal transmitted by the synchro device being adapted to control the rotation of the bracket supporting the angularly movable universal joint member, the rotational angular position of the bracket being directly proportional to the tilt angle of the pivot axis of the gyro outer gimbal.

7. A device for determining the error in the heading angle in the navigation system of a vehicle fitted with a directional gyro having an outer gimbal pivotally supported on a pivot axis co-axial with the nominal vertical axis of the vehicle, to determine and correct for the error introduced into the heading angle of the vehicle as indicated by the outer gimbal of the gyro, the error being caused by tilting the pivot axis of the gyro outer gimbal, comprising a correcting device into which the uncorrected heading angle of the gyro outer gimbal is introduced as a first electrical signal, the tilt angle of the pivot axis of the gyro outer gimbal being introduced as a second electrical signal, independent first and second amplifying means adapted to individually amplify the first and second electrical signals, means controlled by the amplified second electrical signal as amplified by the second amplifying means, adapted to proportionately reproduce the tilt angle of the pivot axis of the gyro outer gimbal, the second electrical voltage as amplified by the second amplifying means being utilized to check the angular position of the tilt angle reproducing means, means controlled by the amplified first electrical signal adapted to proportionately rotatably reproduce the uncorrected heading angle as received, the first electrical signal as amplified by the first amplifying means being utilized to check the rotational angular position of the uncorrected heading angle reproducing means, means directly coupled to the uncorrected heading angle reproducing means adapted to automatically determine and eliminate the error angle from the uncorrected heading angle as received in order to indicate the corrected heading angle of the vehicle, and means for receiving from the correction device the corrected heading angle and converting the corrected heading angle, to an electrical signal and transmitting the electrical signal to a remotely mounted apparatus.

8. A combination heading angle correction device, as in claim 7, in which the angle reproducing means for proportionately reproducing the tilt angle of the pivot axis of the gyro outer gimbal includes a universal joint consisting of a fixed axis yoke, and a yoke angularly movable in one plane relative to the fixed axis yoke, pivotally attached to the fixed axis yoke, servo means controlled by the amplified second electrical signal adapted to angularly displace the angularly movable yoke of the universal joint relative to the fixed axis yoke thereof, through an angle proportional to the tilt angle of the pivot axis of the gyro outer gimbal, a bracket rotatably supported by a shaft co-axial with the junction of the pivot axes of the fixed axis yoke and the angularly movable yoke of the universal joint, the fixed axis yoke of the universal joint having a shaft co-axial therewith and fixedly attached thereto, a first synchro control transformer, having a rotatable shaft incorporated therewith, fixedly supported by the rotatably supported bracket, the shaft of the synchro control transformer being aligned with the shaft attached to the fixed axis yoke in one plane, said first synchro control transformer being adapted to receive the first electrical signal, means adapted to amplify the first electrical signal received from the synchro control transformer, a servo motor actuated by the amplified first electrical signal adapted to rotate the fixed axis yoke of the universal joint through an angle directly related to the angle through which the angularly movable yoke is rotated, a generator directly coupled to the servo-motor adapted to transmit an electrical signal to the amplifier, the amplified signal voltage from the amplifier, established by the voltage transmitted by the first synchro control transformer being adapted to control the rotation of the shaft of the servo-motor, coordinated with the rotational angular position of the shaft of the first synchro control transformer attached to the angularly movable yoke of the universal joint, the rotational angular position of the shaft attached to the fixed axis yoke indicating the corrected heading angle of the device after the error angle is eliminated, and means operatively connecting the shaft attached to the fixed axis yoke of the universal joint to the corrected heading angle transmission means.

9. A combination heading angle correction device as in claim 7, in which the angle reproducing means for proportionately reproducing the tilt angle of the pivot axis of the gyro outer gimbal includes a universal joint consisting of a fixed axis yoke and a yoke angularly movable in one plane relative to the fixed axis yoke, pivotally attached to the fixed axis yoke, a bracket rotatably supported by a shaft co-axial with the junction of the pivot axes of the fixed axis yoke and the angularly movable yoke of the universal joint, a first synchro control transformer attached to said bracket in co-axial alignment with the angularly movable yoke of the universal joint, a ring gear attached to said bracket concentric with the axis of rotation thereof, a servo-motor mounted substantially parallel to the axis of rotation of the bracket adapted to rotate the bracket by means of a gear train incorporated between the servo motor and the bracket ring gear, a second synchro control transformer having a shaft co-axial therewith and projecting therefrom mounted substantially parallel to the axis of rotation of the bracket, the shaft of said second synchro control transformer being rotatable by the bracket pivot shaft, said second synchro control transformer being adapted to receive the second electrical signal, the second amplifying means being adapted to amplify the second electrical signal received from the second synchro control transformer, a generator directly coupled to the servo motor operative to feed an electrical signal back to the second amplifying means, the amplified signal voltage established by the signal transmitted by the second synchro control transformer being adapted to control the rotation of the rotatable bracket, the rotational angular position of the bracket and the first synchro control transformer supported thereby being directly proportional to the tilt angle of the pivot axis of the gyro outer gimbal.

10. A combination heading angle correction device, as in claim 7, in which the angle reproducing means for proportionately reproducing the tilt angle of the pivot axis of the gyro outer gimbal includes a universal joint consisting of a fixed axis yoke, and a yoke angularly movable in one plane relative to the fixed axis yoke, pivotally attached to the fixed axis yoke, a bracket rotatably supported by a shaft co-axial with the junction of the pivot axes of the fixed axis yoke and the angularly movable yoke of the universal joint, a first synchro control transformer having a rotatable projecting shaft, attached to said bracket in co-axial alignment with the angularly movable yoke, a ring gear attached to said bracket concentric with the axis of rotation thereof, a servo-motor mounted substantially parallel to the axis of rotation of the bracket adapted to rotate the bracket by means of a gear train incorporated between the servo motor and the bracket ring gear, a second synchro control transformer having a shaft co-axial therewith and projecting therefrom mounted substantially parallel to the axis of rotation of the bracket, the shaft of said second synchro control transformer being rotatable by the rotatable shaft supporting the bracket, said second synchro control transformer being adapted to receive the second electrical signal, the second amplifying means being adapted to amplify the second electrical signal received from the second synchro control transformer, a generator directly coupled to the servo motor adapted to transmit an electrical signal to the second amplifying means, the amplified signal voltage established by the signal transmitted by the second synchro control transformer being adapted to control the rotation of the rotatable bracket, the rotational angular position of the bracket and the first synchro control transformer supported thereby being directly proportional to the tilt angle of the pivot axis of the gyro outer gimbal, the shaft of the first synchro control transformer being aligned with the shaft attached to the fixed axis of the universal joint in one plane, said first synchro control transformer being adapted to receive the first electrical signal, the first amplifying means being operative to amplify the first electrical signal received from the first synchro control transformer, a heading angle servo motor actuated by the amplified first electrical signal adapted to rotate the fixed axis yoke of the universal joint through an angle directly related to the angle through which the angularly movable yoke is rotated, a generator directly coupled to the heading angle servo-motor operative to transmit an electrical signal to the first amplifying means, the amplified signal voltage from the first amplifying means established by the voltage transmitted by the heading angle synchro control transformer being adapted to control the rotation of the shaft of the heading angle servo-motor, co-ordinated with the rotational angular position of the shaft of the first synchro control transformer, the rotational angular position of the shaft of the fixed axis yoke indicating the corrected heading angle of the correction device after the error angle has been eliminated, and means operatively connecting the shaft attached to the fixed axis yoke of the universal joint to the corrected heading angle transmission means.

References Cited in the file of this patent
UNITED STATES PATENTS

| | | |
|---|---|---|
| 1,288,577 | Hartmann | Dec. 24, 1918 |
| 1,899,170 | Wainwright | Feb. 28, 1933 |
| 2,221,748 | Alkan | Nov. 19, 1940 |